US010486242B2

(12) United States Patent
Kasahara et al.

(10) Patent No.: US 10,486,242 B2
(45) Date of Patent: Nov. 26, 2019

(54) DRILLING APPARATUS

(71) Applicant: KAWASAKI JUKOGYO KABUSHIKI KAISHA, Kobe-shi, Hyogo (JP)

(72) Inventors: Kenji Kasahara, Gifu (JP); Tomoya Nakagawa, Yatomi (JP); Osamu Ohji, Kako-gun (JP); Yuuki Hanawa, Akashi (JP); Shogo Kojima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/794,783

(22) Filed: Oct. 26, 2017

(65) Prior Publication Data
US 2018/0111204 A1 Apr. 26, 2018

(30) Foreign Application Priority Data

Oct. 26, 2016 (JP) .................................. 2016-209214

(51) Int. Cl.
*B23B 49/02* (2006.01)
*B23Q 17/24* (2006.01)
(Continued)

(52) U.S. Cl.
CPC .............. *B23B 49/02* (2013.01); *B23B 49/00* (2013.01); *B23Q 17/2409* (2013.01);
(Continued)

(58) Field of Classification Search
CPC .... B23Q 17/2409; B23Q 17/20; B23Q 17/24; B23Q 3/002; B23Q 17/2404; B23B 49/00;
(Continued)

(56) References Cited

U.S. PATENT DOCUMENTS 4,340,326 A * 7/1982 Buonauro ............. B23B 49/001
250/559.4
4,667,113 A * 5/1987 Nakajima ............. B23B 49/001
250/559.08
(Continued)

FOREIGN PATENT DOCUMENTS

JP          61086110 A  *  5/1986  ........... B23B 49/001
JP          S61-169513 U    10/1986
JP          H11-188693 A     7/1999

OTHER PUBLICATIONS

English Translation of JP 61086110 A (Year: 1986).*

*Primary Examiner* — Alan Snyder
*Assistant Examiner* — Yasir A Diab
(74) *Attorney, Agent, or Firm* — Oliff PLC

(57) ABSTRACT

A drilling apparatus includes: a table supporting a plate; a drill machining a through-hole in the plate; an annular pressing member pressing the plate around the through-hole; a camera capturing a plate surface image through an inner space of the pressing member; and a moving device moving the drill between machining and retraction positions, the machining position being at which the drill center coincides with the pressing member center, the retraction position being a position at which the drill is positioned outside a field of view of the camera. Insertion holes distributed in a circumferential direction are formed in the pressing member, and illumination devices, each emitting light to the plate surface around the through-hole, are inserted in the respective insertion holes. An optical axis direction of each of the illumination devices inserted in the respective insertion holes and the plate surface form an angle of 25 to 60°.

2 Claims, 2 Drawing Sheets

(51) Int. Cl.
*B23B 49/00* (2006.01)
*B23Q 3/00* (2006.01)

(52) U.S. Cl.
CPC .......... *B23B 2270/48* (2013.01); *B23Q 3/002* (2013.01); *Y10T 408/21* (2015.01)

(58) Field of Classification Search
CPC ............... B23B 2270/48; Y10T 408/21; Y10T 408/172; Y10T 408/05
See application file for complete search history.

(56) References Cited

U.S. PATENT DOCUMENTS

| | | | | |
|---|---|---|---|---|
| 5,255,199 | A * | 10/1993 | Barkman | B23Q 17/09 348/94 |
| 5,439,328 | A * | 8/1995 | Haggerty | G05B 19/402 408/1 R |
| 5,522,683 | A * | 6/1996 | Kakimoto | B23B 41/00 408/13 |
| 5,696,383 | A * | 12/1997 | Cheng | G01B 11/16 250/559.22 |
| 5,741,096 | A * | 4/1998 | Olds | B23Q 17/22 408/1 R |
| 6,059,494 | A * | 5/2000 | Susnjara | B23Q 11/006 408/11 |
| 7,988,390 | B2 * | 8/2011 | Shen | B23Q 17/22 248/160 |

* cited by examiner

DRILLING APPARATUS

BACKGROUND OF THE INVENTION

1. Field of the Invention

The present invention relates to a drilling apparatus including a drill that machines a through-hole in a plate.

2. Description of the Related Art

There is a known drilling apparatus including a drill, a table that supports a plate, and an annular pressing member that presses the plate around a through-hole machined in the plate (see, for example, Japanese Laid-Open Utility Model Application Publication No. S61-169513). The pressing member is often called a pressure foot.

SUMMARY OF THE INVENTION

In the case of machining a through-hole in a plate by a drill, there are cases where swarf generated from the machining rotates together with the drill, and the rotating swarf forms circular scratches (arc-shaped or round flaws) on the surface of the plate in a manner to surround the through-hole. Therefore, it is necessary to perform an inspection to check whether or not such circular scratches are present.

Usually, this circular scratch inspection is visually performed by a person. However, in order to realize uniform inspection quality, there is a demand for automatic inspection. In the case of performing an automatic circular scratch inspection, in order to reduce the inspection time, it is conceivable to perform the inspection in a state where the plate is pressed by the pressing member immediately after the through-hole has been machined in the plate by the drill of the drilling apparatus. In order to realize this, the drill may be made movable between its machining position and retraction position, and an image of the surface of the plate may be captured by a camera through an inner space of the annular pressing member.

For the image capturing by the camera, it is necessary to irradiate the surface of the plate around the through-hole with light. However, since the annular pressing member is present around the through-hole, it is necessary to emit the light through the inner space of the pressing member from a direction in which the camera is present. In this case, the light that is reflected regularly on the surface of the plate is directly incident on the camera (bright-field technique). However, with the bright-field technique, circular scratches captured in the image cannot be precisely detected.

On the other hand, in the case of adopting a dark field technique, the light is emitted at such an angle that the light reflected regularly on the surface of the plate is not directly incident on the camera, but the light that is reflected irregularly on the circular scratches is directly incident on the camera. This makes it possible to precisely detect the circular scratches. However, the irradiation of the surface of the plate with the light emitted at such a low angle is hindered by the presence of the pressing member.

In view of the above, an object of the present invention is to provide a drilling apparatus capable of an automatic circular scratch inspection using a dark field technique.

In order to solve the above-described problems, a drilling apparatus according to the present invention includes: a table that supports a plate; a drill that machines a through-hole in the plate; an annular pressing member that presses the plate around the through-hole; a camera that captures an image of a surface of the plate through an inner space of the pressing member; and a moving device that moves the drill between a machining position and a retraction position, the machining position being a position at which a center of the drill coincides with a center of the pressing member, the retraction position being a position at which the drill is positioned outside a field of view of the camera. A plurality of insertion holes distributed in a circumferential direction are formed in the pressing member, and illumination devices, each of which emits light to the surface of the plate around the through-hole, are inserted in the respective insertion holes. An optical axis direction of each of the illumination devices inserted in the respective insertion holes and the surface of the plate form an angle of 25 to 60°.

According to the above-described configuration, the illumination devices are inserted in the respective insertion holes formed in the annular pressing member, and the angle formed between the optical axis direction of each illumination device and the surface of the plate is 25 to 60°. Therefore, the light that is reflected regularly on the surface of the plate is not directly incident on the camera. This makes it possible to perform an automatic circular scratch inspection using a dark field technique.

The present invention makes it possible to perform an automatic circular scratch inspection using a dark field technique.

The above and other objects, features, and advantages of the present invention will more fully be apparent from the following detailed description of a preferred embodiment with accompanying drawings.

DESCRIPTION OF THE PREFERRED EMBODIMENTS

Figure 1:
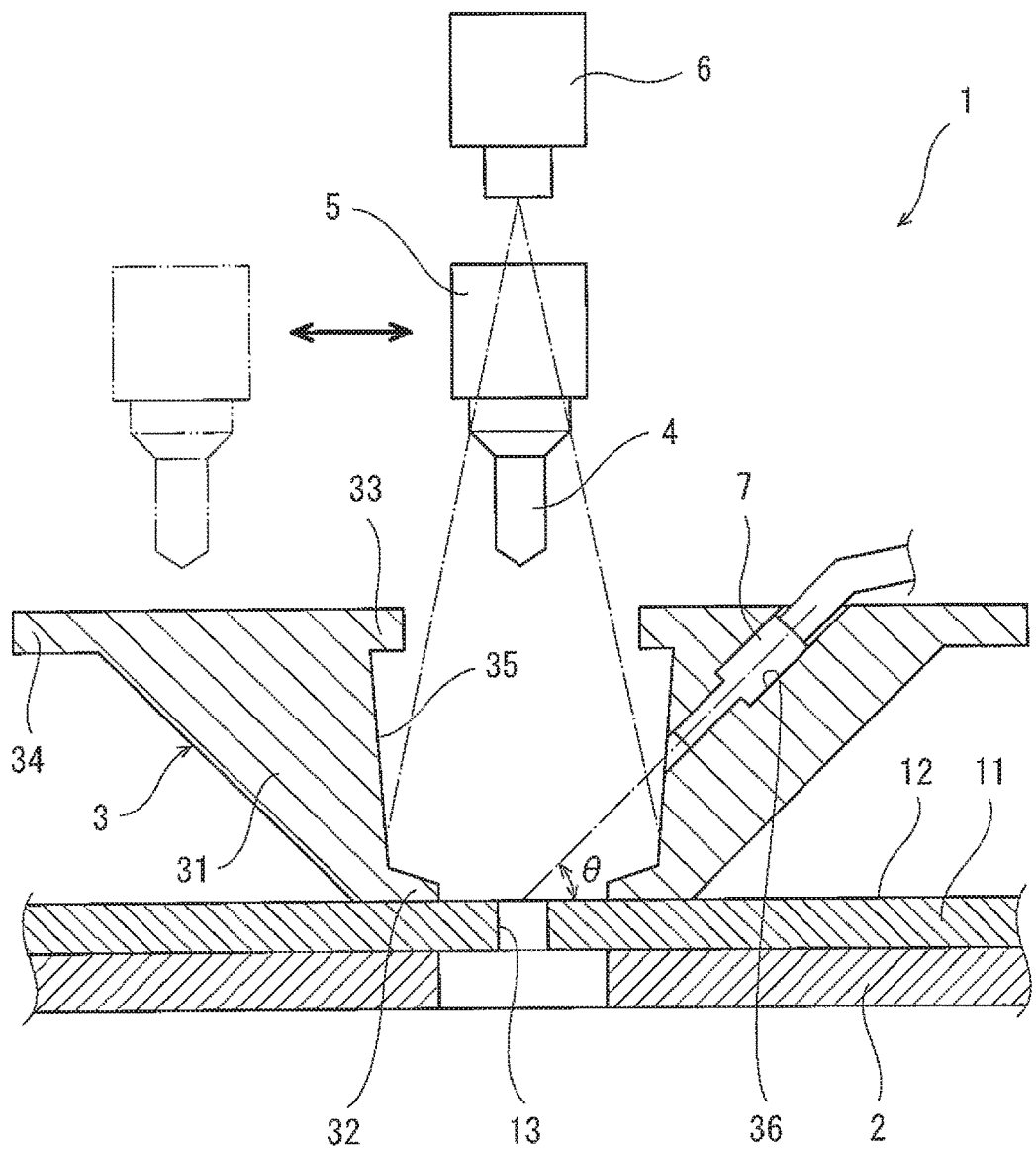
FIG. 1 is a sectional view of a drilling apparatus according to one embodiment.

FIG. 1 shows a drilling apparatus 1 according to one embodiment. The drilling apparatus 1 includes: a table 2, which supports a plate 11; a drill 4, which machines a through-hole 13 in the plate 11; and an annular pressing member 3 (see FIG. 2), which presses the plate around the through-hole 13. The drilling apparatus 1 further includes a camera 6, which captures an image of a surface 12 of the plate 11 through an inner space of the pressing member 3.

The drill 4 is moved by a moving device 5 between a machining position shown in FIG. 1 by solid line and a retraction position shown in FIG. 1 by two-dot chain line. The machining position is a position at which the center of the drill 4 coincides with the center of the pressing member 3. The retraction position is a position at which the drill 4 is positioned outside the field of view of the camera 6. Further, the moving device 5 lowers the drill 4 positioned at the machining position to push the drill 4 against the plate 11 inside the pressing member 3, and lifts the drill 4 to such a position that the drill 4 gets out of the inner space of the pressing member 3.

Figure 2:
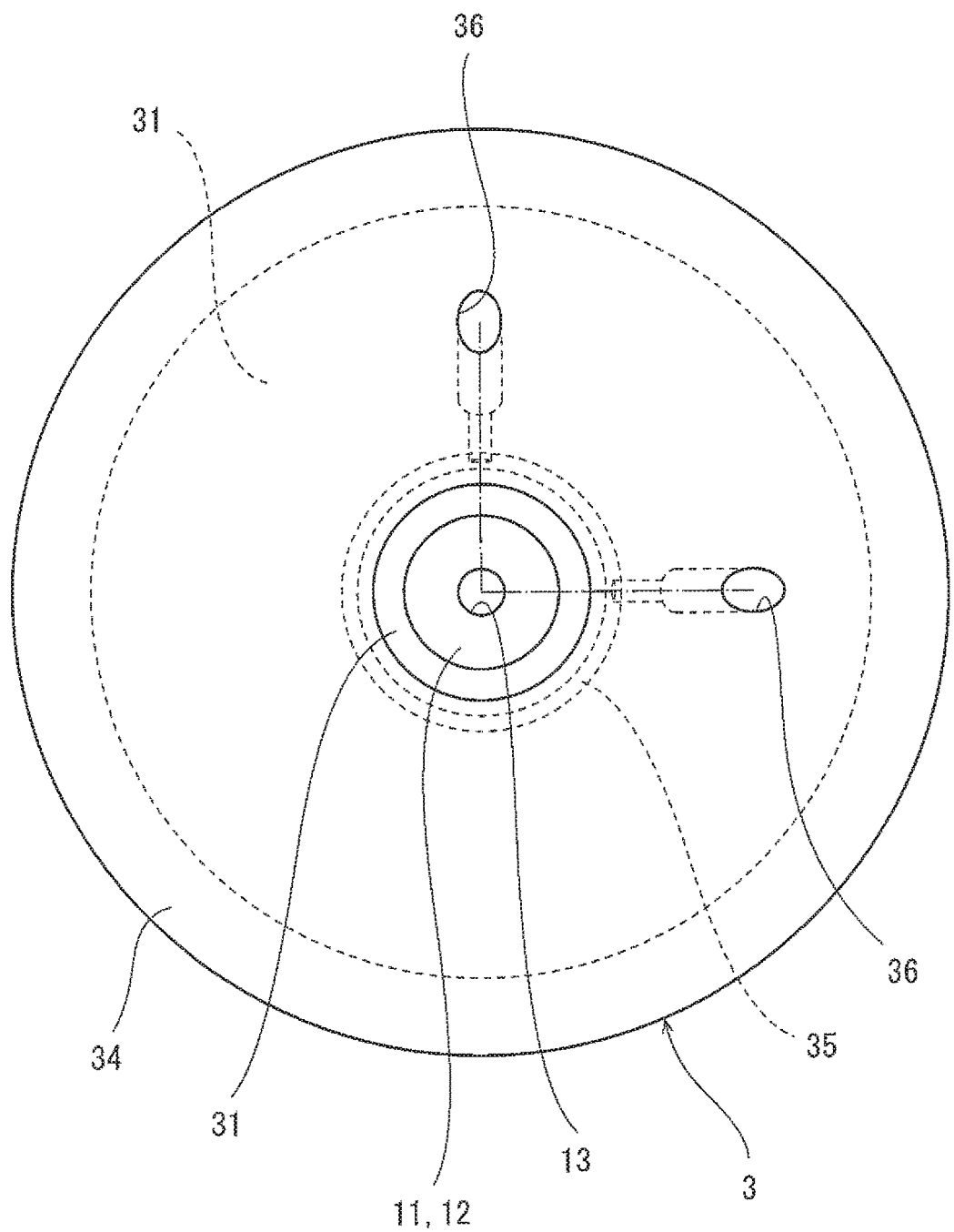
FIG. 2 is a plan view of a pressing member.

As shown in FIG. 2, the pressing member 3 has an internal diameter that is sufficiently greater than the diameter of the through-hole 13. In the present embodiment, as shown in FIG. 1 and FIG. 2, the pressing member 3 includes: a cylindrical body 31 whose axial direction coincides with the thickness direction of the plate 11; and three flanges (a first flange 32, a second flange 33, and a third flange 34).

The body 31 includes an inner peripheral surface and an outer peripheral surface, both of which extend radially outward away from the plate 11. The outer peripheral surface has a taper angle (an angle relative to the axial direction of the body 31) greater than that of the inner peripheral surface. That is, the sectional shape of the body 31 is trapezoidal, i.e., the width of the body 31 increases in accordance with increase in the distance from the plate 11. The first flange 32 protrudes radially inward from one end portion of the body 31, the one end portion being positioned at the plate 11 side, and the second flange 33 protrudes radially inward from the other end portion of the body 31, the other end portion being positioned at the opposite side to the plate 11 side. The third flange 34 protrudes radially outward from the other end portion of the body 31, the other end portion being positioned at the opposite side to the plate 11 side. The top surface of the body 31 (in FIG. 1, the lower surface) is flush with one surface of the first flange 32, and these surfaces form a contact surface that contacts the surface 12 of the plate 11. The bottom surface of the body 31 (in FIG. 1, the upper surface) is flush with one surface of the second flange 33 and one surface of the third flange 34, and these surfaces form a surface parallel to the surface 12 of the plate 11. It should be noted that the shape of the pressing member 3 is not limited to this example, but may be suitably changed.

A plurality of insertion holes 36 distributed in the circumferential direction are formed in the body 31 of the pressing member 3. Illumination devices 7 are inserted in the respective insertion holes 36. In the present embodiment, the number of insertion holes 36 is two. The optical axis directions of the respective illumination devices 7 inserted in the insertion holes 36 are substantially perpendicular to each other when seen in the thickness direction of the plate 11. The wording "substantially perpendicular" herein means that the angle between the optical axis directions of the respective illumination devices 7 is 70 to 110°. It should be noted that the number of insertion holes 36 may be three or more.

Each of the illumination devices 7 inserted in the respective insertion holes 36 emits light to the surface 12 of the plate 11 around the through-hole 13. Accordingly, each insertion hole 36 is formed to extend straight as seen from the center of the through-hole 13, such that the insertion hole 36 is open at the bottom surface of the body 31 and at an inner peripheral surface 35 of the body 31 between the first flange 32 and the second flange 33. The optical axis direction of each of the illumination devices 7 inserted in the respective insertion holes 36 and the surface 12 of the plate 11 form an angle θ of 25 to 60°.

Each illumination device 7 may be a compact spotlight, or may be a distal end portion of a light guide.

As described above, in the drilling apparatus 1 of the present embodiment, the illumination devices 7 are inserted in the respective insertion holes 36 formed in the annular pressing member 3, and the angle θ formed between the optical axis direction of each illumination device 7 and the surface 12 of the plate 11 is 25 to 60°. Therefore, the light that is reflected regularly on the surface 12 of the plate 11 is not directly incident on the camera 6. This makes it possible to perform an automatic circular scratch inspection using a dark field technique.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

REFERENCE SIGNS LIST 1 drilling apparatus
11 plate
12 surface
13 through-hole
2 table
3 pressing member
36 insertion hole
4 drill
5 moving device
6 camera
7 illumination device

What is claimed is:

1. A drilling apparatus comprising:
a table that supports a plate;
a drill that machines a through-hole in the plate;
an annular pressing member that presses the plate around the through-hole;
a camera that captures an image of a surface of the plate through an inner space of the pressing member by a dark field technique, the camera being disposed on an extension of a center line of the pressing member;
a moving device that moves the drill between a machining position and a retraction position, the machining position being a position at which a center of the drill coincides with a center of the pressing member, the retraction position being a position at which the drill is positioned outside a field of view of the camera; and
a plurality of illumination devices disposed at a same side as the camera with respect to the plate, the illumination devices each emitting light to the surface of the plate around the through-hole, such that the light that is reflected regularly on the surface of the plate is not incident on the camera, wherein
a plurality of insertion holes distributed in a circumferential direction are formed in the pressing member, and the plurality of illumination devices are inserted in the respective insertion holes, and
an optical axis direction of each of the illumination devices inserted in the respective insertion holes and the surface of the plate form an angle of 25 to 60°.

2. The drilling apparatus according to claim 1, wherein a number of the plurality of insertion holes is two, and
the optical axis directions of the respective illumination devices inserted in the two insertion holes are substantially perpendicular to each other when seen in a thickness direction of the plate.

* * * * *